United States Patent

Salcher et al.

[11] Patent Number: 6,009,969
[45] Date of Patent: Jan. 4, 2000

[54] METHOD FOR THE AUTOMATIC CONTROL OF THE LOCKING CLUTCHES OF AN ALL-WHEEL DRIVEN VEHICLE, AND VEHICLE WITH ARTICULATED-VEHICLE STEERING AND LOCKABLE DIFFERENTIALS

[75] Inventors: Harald Salcher, Sierning; Gerhard Frühwirth, Schönau; Franz Stelzeneder, Steyr, all of Austria

[73] Assignee: Steyr-Daimler-Puch Aktiengesellschaft, Vienna, Austria

[21] Appl. No.: 08/977,355

[22] Filed: Nov. 24, 1997

[30] Foreign Application Priority Data

Dec. 4, 1996 [AT] Austria ..................................... 2108/96

[51] Int. Cl.$^7$ ................................................. B60K 23/04
[52] U.S. Cl. .............................. 180/249; 180/197; 701/88
[58] Field of Search ..................................... 180/233, 248, 180/249, 250, 197; 701/88

[56] References Cited

U.S. PATENT DOCUMENTS

| | | |
|---|---|---|
| 4,511,011 | 4/1985 | Makita . |
| 5,005,131 | 4/1991 | Imaseki et al. ........................... 701/88 |
| 5,301,768 | 4/1994 | Ishikawa et al. ........................ 180/249 |
| 5,332,059 | 7/1994 | Shirakawa et al. ...................... 180/197 |
| 5,535,124 | 7/1996 | Hosseini et al. .......................... 701/83 |
| 5,570,755 | 11/1996 | Fruhwirth et al. . |

FOREIGN PATENT DOCUMENTS

| | | |
|---|---|---|
| 0314453 | 7/1993 | European Pat. Off. . |
| 0438178 | 8/1993 | European Pat. Off. . |
| 0396323 | 9/1993 | European Pat. Off. . |
| 0605559 | 2/1996 | European Pat. Off. . |
| 4327507 | 7/1996 | Germany . |

Primary Examiner—Kevin Hurley
Attorney, Agent, or Firm—Bachman & LaPointe P.C.

[57] ABSTRACT

A method for the automatic locking of the differentials of an all-wheel driven vehicle, slip signals being formed which, as soon as they exceed a threshold value, initiate the driving of the respective differentials. In order to take into account the influence of the steering rolling radius, the change in the steering value is ascertained. From this, using a function determined by the geometry of the vehicle, an apparent slip is ascertained. From the respective apparent slip, corrected threshold values are determined and measured slip signals are compared with the corrected threshold values and, if necessary, the driving of the respective differential is initiated. The method can also be used on a vehicle having articulated-vehicle steering.

8 Claims, 3 Drawing Sheets

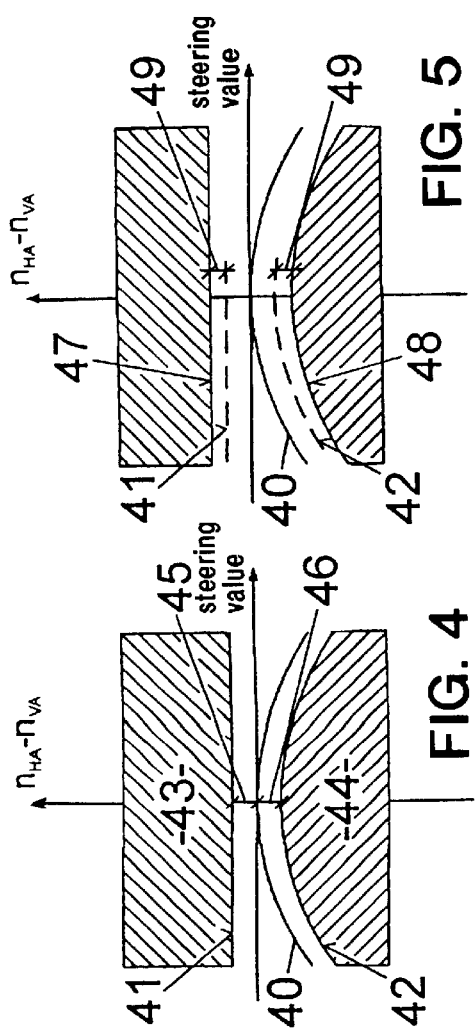
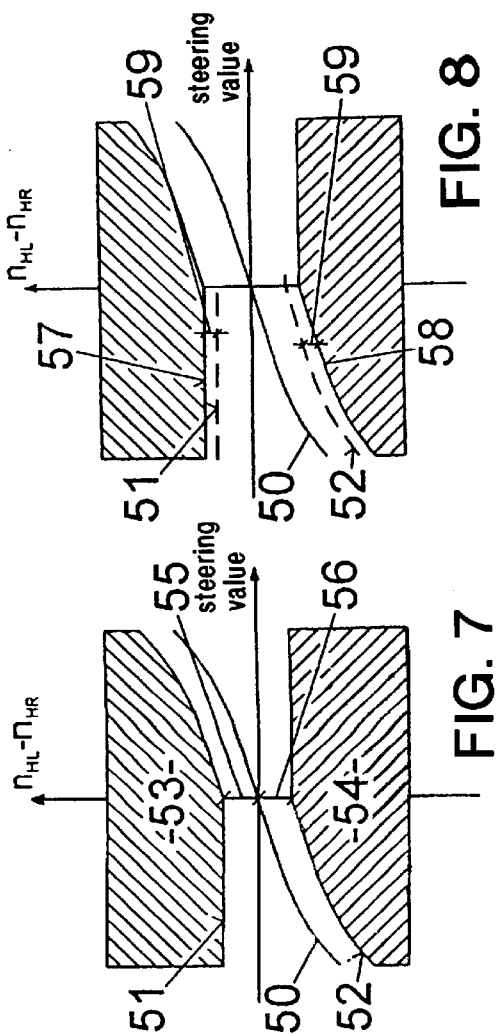
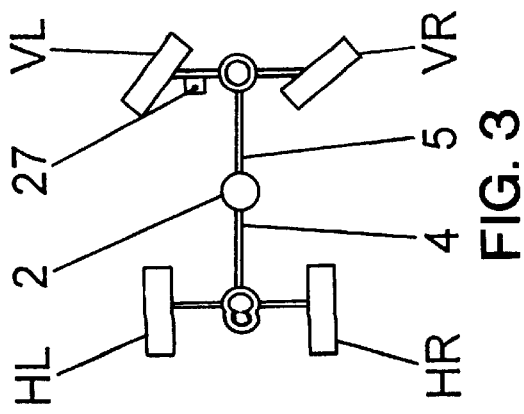
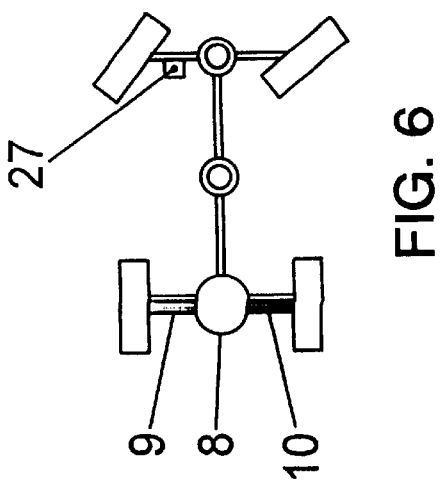

METHOD FOR THE AUTOMATIC CONTROL OF THE LOCKING CLUTCHES OF AN ALL-WHEEL DRIVEN VEHICLE, AND VEHICLE WITH ARTICULATED-VEHICLE STEERING AND LOCKABLE DIFFERENTIALS

BACKGROUND OF THE INVENTION

The invention deals with a method for the automatic control of the locking clutches of the differentials of an all-wheel driven vehicle, the differentials each having an input shaft and two output shafts and, starting from pulses corresponding to the rotation of the two output shafts, in each case slip signals being formed which, as soon as they exceed a threshold value, initiate the driving of the locking clutch of the respective differential.

A device for practicing a method of this type in the case of an all-wheel driven vehicle having a plurality of differentials (in-axle differentials, inter-axle differential) is known from DE 43 27 507 C2. Using the measures described there, it is ensured that in all driving situations the correct locking clutch is actuated at the correct instant. This also requires that locking clutches are not unnecessarily switched, in order to impede steering as little as possible. For this reason, taking into account the steering lock is also provided.

However, in the case of vehicles in which steering at a standstill already leads to considerable rotation of individual wheels, which is perceived by the control system as slip, then locking of a differential may occur inopportunely, which severely impedes the steering and leads to unnecessary stresses in the drive train. This is not an effect of the steering lock, which can otherwise already be taken into account in the threshold value, but an effect of the change in said steering lock, that is to say in its first derivative.

Vehicles of this type are either vehicles with articulated-vehicle steering or vehicles (for example construction vehicles) having steering-knuckle steering, whose axis geometry necessitates a large steering rolling radius. The latter fact means that the extension of the steering axis intersects the ground at a relatively great distance from the point on which the wheel stands. In the case of vehicles with articulated-vehicle steering, the articulation axis does not have to be in the longitudinal center of the vehicle, and it may have more than two driven axles. The steering lock is referred to in the following text as the steering value, and is either the steering angle of a vehicle with steering-knuckle steering or the articulation angle of a vehicle with articulated-vehicle steering.

Although it is know, from EP 605 559 B1, to brake individual wheels in a controllable manner in the case of vehicles having articulated-vehicle steering, in order to improve traction, and in order to avoid the problems when using a lockable differential, in particular when driving through curves, in this case the wheel rotational speed differential signals are, however, corrected only as a function of the articulation angle (=steering value).

The use of friction brakes (as distinct from friction clutches between the elements of the differential) is a disadvantage, however, because of high energy losses and a reduction in the total torque that is available. The correction of the wheel rotational speed differential signals does not lead to the target for the locking control system, since it cannot be detected whether the pulses additionally caused by the steering movement have to be added with a positive or negative sign. It is also not possible to detect whether the traction loss (as a result of spinning of a wheel or several wheels) relates to the slower or faster output shaft, induced by the kinematic slip. The kinematic slip is to be understood as the rotational speed differences between the wheels as a result of the different track radii of the individual wheels in the curve. In addition, the influence of the steering value change in this known vehicle remains completely unconsidered, which can lead to the vehicle becoming unsteerable as the result of brake engagement on one side (only), or the steering becomes overloaded and breaks.

SUMMARY OF THE INVENTION

It is the principle object of the present invention to provide a method of controlling the differential locks in vehicle of the type described in such a way that changes in the steering value are taken into account so that optimal traction is achieved without impairing the steerability.

The foregoing object is achieved by the inventive method, wherein:

(a) a steering value is measured and its change with respect to the previously measured steering value is ascertained, (b) from the change in the steering value, using a function determined by the steering-geometry variables of the vehicle, an apparent slip is ascertained, which corresponds to the twisting between the two output shafts of the respective differential as a result of changing the steering value with the vehicle at a standstill, (c) from the respective threshold values and the respective apparent slip, corrected threshold values are determined, (d) slip signals formed form the relative twist of the output shafts are compared with the corrected threshold values and, if the respective corrected threshold value is exceeded, the driving of the locking clutch of the respective differential is initiated.

Only by taking into account the change in the steering value is it possible to solve the problem in vehicles in which steering at a standstill already leads to considerable rotation of individual wheels. To this end, the absolute difference between the rotation of individual wheels when changing the steering value and with the vehicle at a standstill is calculated.

Both the twisting between the output shafts and the associated threshold values can be defined either as an angle of rotation or rolling path of the respective wheel or else as an angular speed or circumferential speed of the respective wheel. Correspondingly, the slip signals are then either slip sums (which are obtained, for example, by means of integration over the slip) and the threshold values are slip sum thresholds, or the slip signals are the instantaneous slip (with the dimension of a speed) and the threshold values are slip thresholds.

By virtue of the fact that the threshold values (of which at least two must certainly be present because of the reversal of sign of the slip), but not the slip values themselves are corrected, it is not necessary to distinguish which of the two output shafts is rotating more rapidly because of loss of ground adhesion.

In a preferred method, the method further includes:

(a) the slip signals and the threshold values have the dimension of a rotational speed difference, (b) the steering value is measured at specific time intervals, so that its change in these specific time intervals is a rate of change, (c) from this rate of change of the steering value for the respective differential an apparent slip is calculated, (d) and that the threshold values are corrected additively with the apparent slip.

Thus, in the simplest conceivable way, the change in the steering value and also the rate at which this is taking place are taken into account, and the measured rotational speed differences can be compared directly with a threshold value. If, as described in DE 43 27 507 C2, when exceeding these threshold values firstly the formation of the slip sums that are decisive for the actual engagement of the locking clutches by means of integration is started, then only this threshold value is changed by the correction for the steering value. The engagement of the locking clutches themselves is then no longer impaired by the correction.

The inventive method is particularly well suited for vehicles in whose drive train the locking clutches are self-disengaging claw clutches and in the control of which the threshold values depend on the steering value, in order to take account of the kinematic slip. Kinematic slip is to be understood as the rotational speed difference between the respective wheels caused by the instantaneous steering value (not by its change), particular significance being attached to taking it into account when using claw clutches. In this way, the threshold values are corrected both with regard to the steering value and with regard to the change in the steering value.

In a further development of the invention, the threshold values corrected with regard to the steering value (of which, depending on the sign of the slip, there are two in each case) are defined as follows: when slip occurs at the kinematically-induced slower output shaft, the threshold values are distinguished by a constant rotational speed difference from the kinematic slip at the respective steering value, if slip occurs at the kinematically-induced faster output shaft, the threshold values are constant, that is to say independent of the steering value. Hence, incipient slip of the output shaft that is slower because of the kinematic slip is initially ignored. Inter alia, this achieves the advantage that certain geometric variables of the vehicle (for example the wheelbase) can be changed without having to change the parameters that are decisive for the kinematic correction in the memory of the control device.

The inventive method can be used both for vehicles with steering-knuckle steering (then the steering value is a steering angle) and for vehicles steered by articulation (then the steering value is the articulation angle).

Finally, the invention also concerns an all-wheel driven vehicle having articulated-vehicle steering and lockable differentials, which are locked if slip signals exceed specific threshold values. The fact that the disadvantages cited in connection with EP 605 559 B1 do not occur is achieved, according to the invention, in that the threshold values are corrected by an apparent slip corresponding to the change in the articulation angle. This can also be performed in accordance with the inventive method.

BRIEF DESCRIPTION OF THE DRAWINGS

In the following text, the invention is described and explained using figures, in which.

DETAILED DESCRIPTION

Figure 1:
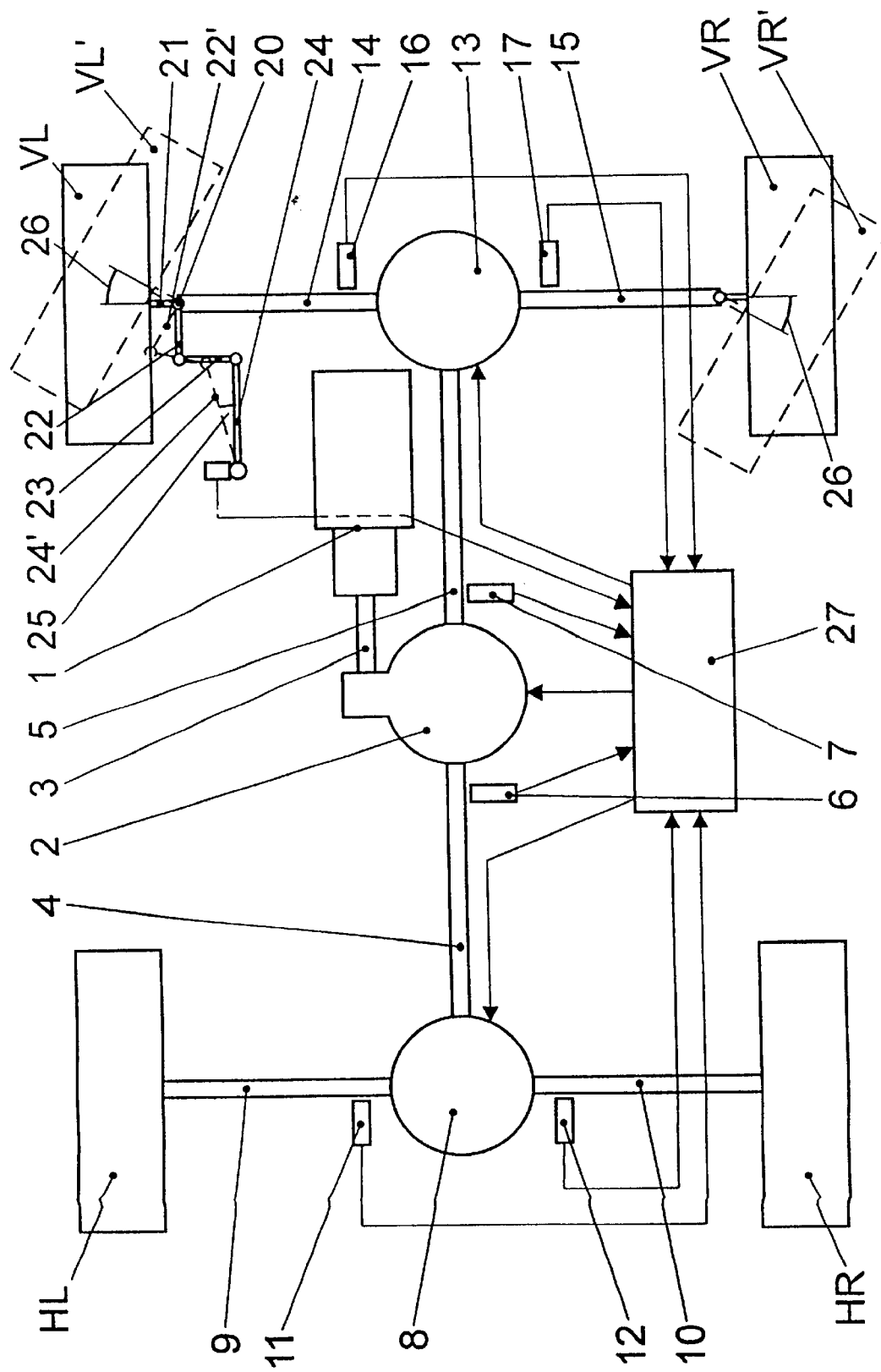
FIG. 1—represents a plan view of a vehicle according to the invention in a first embodiment, with steering-knuckle steering, FIG. 2—represents a plan view of a vehicle according to the invention in a second embodiment, with articulated-vehicle steering, FIG. 3—represents a schematic illustration of the first embodiment in a first operating state, FIG. 4—represents a functional depiction relating to FIG. 3, FIG. 5—represents a functional depiction relating to FIG. 3, FIG. 6—represents a schematic illustration of the first embodiment in a second operating state, FIG. 7—represents a functional depiction relating to FIG. 6, and FIG. 8—represents a functional depiction relating to FIG. 6.

FIG. 1 shows, as a first embodiment, a vehicle with steering-knuckle steering. The driven engine/gearbox unit is designated by 1. It drives a lockable central differential 2 via an input shaft 3. The locks themselves are not represented, they comprise externally driven friction or claw clutches. The central differential 2 distributes the input torque to a first output shaft 4 and a second output shaft 5, whose rotational movement is monitored via pulse transmitters 6, 7.

The first output shaft 4 leads to a rear-axle differential 8, which distributes the torque to a first output shaft 9 and a second output shaft 10, whose rotational movement is in turn monitored by pulse transmitters 11, 12. The wheels driven by the output shafts 9, 10 are designated by RL (rear left wheel) and RR (rear right wheel). 8, 9 and 10 together are the rear axle, which is designated further below by RA.

The shaft 5 drives a front-axle differential 13, which distributes the torque to a first output shaft 14 and a second output shaft 15, whose rotational movement is also in turn monitored by pulse transmitters 16, 17. Instead of locking the front-axle differential 13, provision can also be made to connect in the front-axle drive by means of a clutch. The inventive method also permits this mode of operation.

The front axle is steered. To this end, the wheel carriers 21, whose radius is the steering rolling radius, are pivotable about axes 20, which for the purpose of simplicity are drawn vertically. A track-rod arm 22 permanently connected to the wheel carrier 21 is moved by a steering arm 24 via a track rod 23. In the case of the front right wheel (FR), the relationships are similar to those of the front left wheel (FL).

Drawn with dashed lines are the front wheels FL', FR', in a position turned for a right-hand curve. The angle through which in this case the steering arm 24 is pivoted, is designated by 25, and here is the steering angle, further below in general the steering value. Because of the steering rolling radius 21, the front wheel FL rolls forward by a roll path 26 when the steering is turned. The other front wheel (FR) rolls rearward by a corresponding roll path. In so doing, the output shafts 14, 15 twist in opposite directions, which is registered by the pulse transmitters 16, 17 and, like all the counting pulses, reported to a control device 27. A signal indicating the steering angle 25 is also fed to the control device 27. Its output signals then control one each of the differentials 2, 8 and 13.

If the steering movement described is performed during travel, then this effect is superimposed on the rotational speed differences from the various track radii when traveling a curve (kinematic slip) and the rotational speed difference from any slipping wheels (true slip). The differential rotational speeds caused by the steering movement are therefore called apparent slip.

Figure 2:
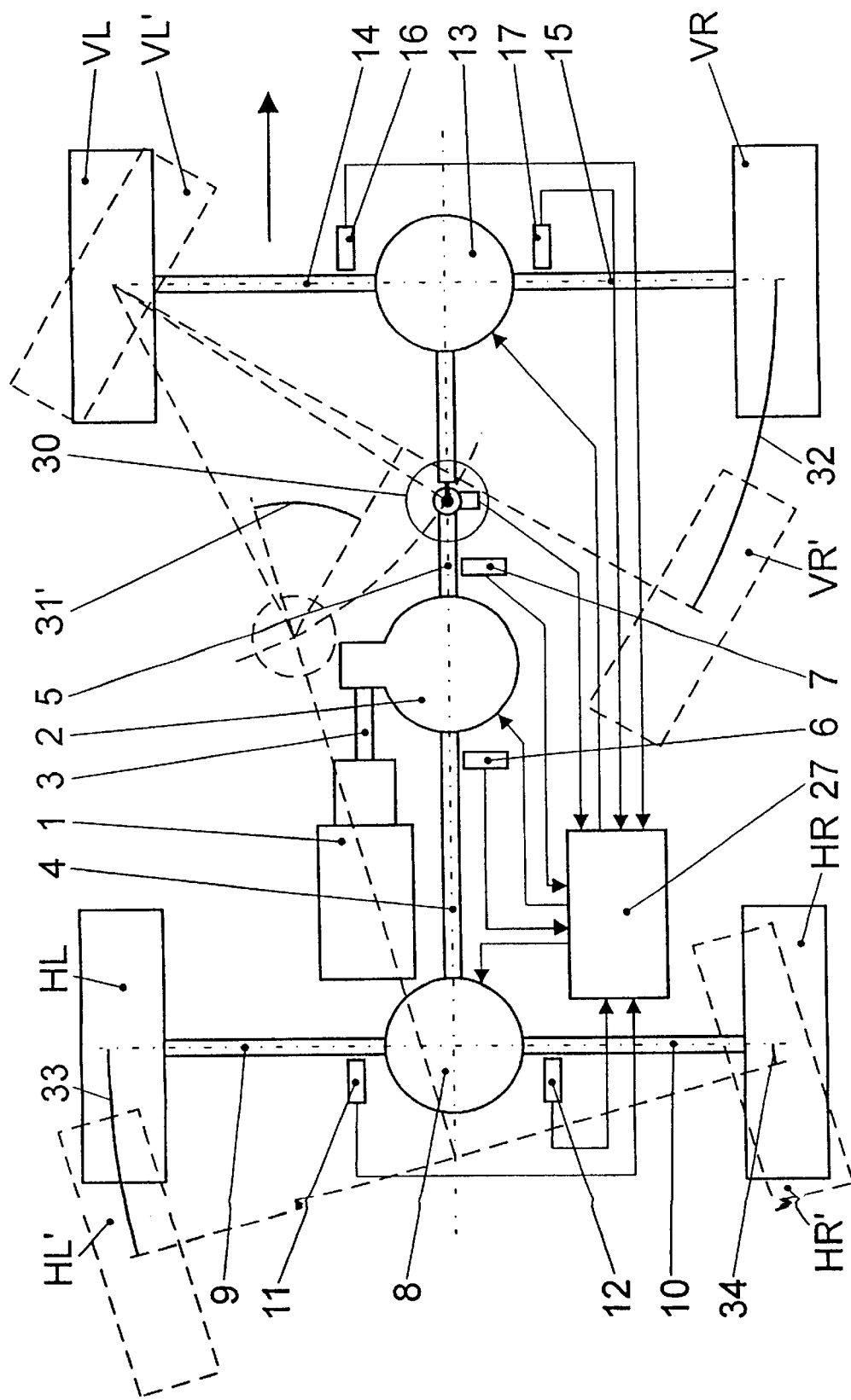

FIG. 2 shows a vehicle according to the invention having articulated-vehicle steering. In the case of this vehicle, the drive train is identical to that of FIG. 1. However, the front axle 13, 14, 15 can be pivoted rigidly and as a whole at an articulation hinge 30, which is a vertical pivot axis, with respect to the remainder of the vehicle. The second output shaft 5 will then need, in the region of the articulation hinge 30, a universal joint, which is not drawn.

The angle through which the two axles are pivoted in relation to each other is called the articulation angle 31, is measured continuously and the value is fed to the control device 27. The articulation angle 31 is also the steering value, analogous to the steering angle in FIG. 1. It is therefore also treated exactly the same by the control device. Only the steering relevant geometric data of the vehicle are different. If this articulated-vehicle steering is actuated with a vehicle at a standstill and, for example, the front left wheel (FL) is held fast, then the front right wheel (FR) traces a roll path 32, until it has assumed the position FR', corresponding to the articulation angle 31', the rear left wheel (RL) traces the roll path 33 and the rear right wheel (RR) traces the roll path 34. There is thus an obvious geometric relationship between the articulation angle 31' and the rotational angle differences between the respective first and second output shafts (4, 5; 10, 11; 14, 15).

The steering method will now be described using FIGS. 3 to 8. FIGS. 3 and 6 show, once more quite schematically, a vehicle having steering-knuckle steering. The relationships are virtually identical in the case of a vehicle having articulated-vehicle steering, for which reason they are not shown specifically for such a vehicle. The difference is only in different geometric relationships between the individual roll paths when moving the steering.

FIGS. 3, 4 and 5 show the relationships with respect to locking the central differential 2, for which reason this is shown filled out in FIG. 3, FIG. 4 shows the relationships still without a correction for the change in the steering value, FIG. 5 then with a correction.

In the depiction of FIG. 4, the steering value is plotted on the horizontal axis, to the right for a right-hand curve and to the left for a left-hand curve. Plotted on the vertical axis, positive at the top and negative at the bottom, are rotational speed differences, the rotational speed difference between the rotational speed of the rear axle (nRA) and the rotational speed of the front axle (nFA) being plotted here, since this concerns the function of the central differential. At the origin of this coordinate system, the vehicle is traveling in a straight line with no kind of slip.

A curve 40 like a parabola passes through this origin. It represents the kinematic slip for a central differential as a function of the steering value. The curve 41 (it is a straight line) allocates a positive threshold value to each steering value. Since it lies on the side of a positive rotational speed difference, it corresponds to slipping of the rear wheels. The curve 42 contains the negative threshold values for all conceivable steering values. It is parallel to the curve 40. Since it lies on the side of negative slip, it corresponds to slipping front wheels. When traveling a curve, if the front wheels begin to slip, then the operating point will wander downward from the curve of the kinematic slip 40, until at a rotational speed difference 46 it reaches the corresponding negative threshold value on the curve 42. However, if the wheels of the rear axle slip, then the operating point will wander upward from the curve 40, via the rotational speed difference 0 (horizontal axis), at which for the first time the rotational speeds of the two output shafts 4, 5 are identical, until the rotational speed difference 45 and hence the corresponding positive threshold value 41 is reached.

When one of the threshold values 41, 42 is reached, either the closure of the locking clutch can be effected directly, or the integration for determining a slip sum can begin, or else the closure of a friction clutch can begin. In any case, the closure of the locking clutch will take place in one of the hatched fields 43 or 44.

FIG. 5 now shows the correction, according to the invention, for the steering rolling radius with a variable steering value. During a steering movement, the superimposed apparent slip 49 described above is produced, which apparent slip is calculated as a rotational speed difference and is known to the control device. For the purpose of correction, the positive and negative threshold values must be shifted in parallel fashion by this rotational speed difference 49 from the stationary value 41, 42 to a corrected value 47, 48. Since the apparent slip 49 depends on the rate of change of the steering value, its value is variable.

FIGS. 6, 7 and 8 show the same with reference to the rear-axle differential 8. In FIGS. 7 and 8, therefore, the difference between the rotational speeds of the rear left wheel (nRL) and the rear right wheel (nRR) is plotted on the vertical axis. The curve 50 once more represents the purely kinematic slip, which changes its sign in the case of an axle differential (differing from the case of a central differential). The curves 51, 52 in FIG. 7 once more show the threshold values when traveling a curve with an unchanged steering value. These threshold values are once more selected in such a way that in the event of a wheel that is already faster as a result of the steering value slips, the curve of the threshold values 51, 52 is reached after a fixed rotational speed difference 55, 56, but in the event of the slower wheel slipping, the change of sign of the rotational speed difference is first awaited and only then is the appropriate threshold value reached. The curves 51, 52 representing the threshold values once more delimit hatched fields 53, 54, for which that which was said with respect to FIG. 4 is also true.

If the steering value is now changed, that is to say a steering movement is carried out, then once more, temporarily and for the duration of this steering movement, the curve of the threshold values 51, 52 is displaced in parallel fashion by an apparent slip 59 calculated in the control device 27, and in this way the corrected threshold values 57, 58 are produced.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

We claim:

1. In an all-wheel driven vehicle having a plurality of respective differentials each having an input shaft, two output shafts, and a pulse transmitter associated with each output shaft for determining a measured slip signal for each respective differential which initiates the driving of a locking clutch of the respective differential when the measured slip signal exceeds a threshold value, a method for the automatic control of the locking clutch of each of the respective differentials comprising:

(a) determining a first steering value;

(b) periodically measuring steering value over time so as to determine a change in steering value with respect to the first steering value;

(c) determining an apparent slip from the change in steering value where the apparent slip corresponds to a twisting between the output shafts of a respective differential;

(d) comparing the apparent slip with the threshold value to determine corrected threshold values from the threshold value and the apparent slip; and (e) comparing the measured slip signal for a respective differential with the corrected threshold values wherein the driving of the locking clutch of the respective differential is initiated when the measured slip signal exceeds the corrected threshold values.

2. The method of claim 1 including the step of using a function determined by steering-geometry variables of the vehicle to determine the apparent slip.

3. The method of claim 1 wherein the threshold values and slip signals have the dimension of differential rotational speed and the method further includes the steps of:

(f) measuring the steering value at specific time intervals to determine a rate of change of the steering value;

(g) determining the apparent slip with the dimension of a differential rotational speed from the rate of change of the steering value; and (h) connecting the threshold values by addition of the apparent slip from step (f).

4. The method of claim 1 wherein the respective locking clutches are self-disengaging claw clutches, and wherein the threshold values are dependent on the steering value so as to take into account kinematic slip.

5. The method of claim 4 wherein the threshold values differ by a selected constant rotational speed difference from the kinematic slip at the respective steering value if the rotational speed is increasing on the kinematically-induced slower output shaft, and the threshold values are constant if the rotational speed is increasing on the kinematically-induced faster output shaft.

6. The control method of claim 5 wherein the steering value is the steering angle of a vehicle with steering-knuckle steering.

7. The method of claim 2 wherein the steering value is the articulation angle of a vehicle steered by articulation.

8. An all-wheel driven vehicle having articulated-vehicle steering and lockable differentials, which are locked if slip signals exceed specific threshold values, wherein the threshold values are corrected by an apparent slip corresponding to the change in the articulation angle.

* * * * *